(12) United States Patent
Hirose et al.

(10) Patent No.: US 6,321,600 B1
(45) Date of Patent: Nov. 27, 2001

(54) ACCELERATION DETECTING DEVICE

(75) Inventors: Shigeru Hirose; Masato Ando; Yoshiyuki Nakamizo; Takeshi Arikura; Tsutomu Sawai, all of Toyama Pref. (JP)

(73) Assignee: Hokuriku Electric Industry Co., Ltd., Toyama Pref. (JP)

( * ) Notice: Subject to any disclaimer, the term of this patent is extended or adjusted under 35 U.S.C. 154(b) by 0 days.

(21) Appl. No.: 09/360,549

(22) Filed: Jul. 26, 1999

(30) Foreign Application Priority Data

Jul. 27, 1998 (JP) .................................................. 10-210968
Dec. 25, 1998 (JP) .................................................. 10-369128

(51) Int. Cl.$^7$ .................................................. G01P 15/09
(52) U.S. Cl. .................................... 73/514.34; 73/514.01
(58) Field of Search ........................... 73/514.01, 514.16, 73/514.32, 514.35, 514.36, 514.38, 862.042, 862.043, 862.044, 862.629, 862.632

(56) References Cited

U.S. PATENT DOCUMENTS

| | | | |
|---|---|---|---|
| 5,365,799 | 11/1994 | Okada | 73/862.041 |
| 5,492,011 | * 2/1996 | Amano et al. | 73/514.16 |
| 5,571,972 | 11/1996 | Okada | 73/862.043 |
| 5,668,318 | * 9/1997 | Okada | 73/504.11 |
| 5,744,718 | * 4/1998 | Okada | 73/514.33 |
| 5,864,062 | * 1/1999 | Nagahara et al. | 73/514.01 |
| 6,148,671 | * 11/2000 | Nakamizo et al. | 73/514.34 |

OTHER PUBLICATIONS

Abstract for Japanese Patent No. 10153614 published Jun. 9, 1998.
Abstract for Japanese Patent No. 10132845 published May 22, 1998.

* cited by examiner

Primary Examiner—Helen Kwok
(74) Attorney, Agent, or Firm—Rankin, Hill, Porter & Clark LLP (57) ABSTRACT

An acceleration detecting device capable of permitting a weight, a diaphragm and a base to be precisely positioned on a casing of a measuring equipment or the like. The weight, diaphragm and base are integrally formed of a metal material into a single unit. An insulating casing is integrally formed while incorporating the single unit as an insert therein. The insulating casing has a recess defined by a side wall thereof, which is formed with a window for exposing a part of the base therethrough. The recess of the casing is closed with a metal cover member, which is mounted on the casing. The cover member is integrally provided with a contactor which is elastically forced against the base through the window. The base is electrically connected to ground terminals of terminal fitments.

6 Claims, 5 Drawing Sheets

ACCELERATION DETECTING DEVICE

BACKGROUND OF THE INVENTION

This invention relates to an acceleration detecting device, and more particularly to an acceleration detecting device for detecting acceleration in all directions.

A conventional acceleration detecting device is typically constructed in such a manner as disclosed in U.S. Pat. No. 5,365,799, U.S. Pat. No. 5,571,972, Japanese Patent Application Laid-Open Publication No. 132845/1998, Japanese Patent Application Laid-Open Publication No. 153614/1998 or the like. The acceleration sensor disclosed includes a diaphragm provided on a central region thereof with a weight, a base made of a metal material and arranged so as to support an outer periphery of the diaphragm, and an acceleration sensor element fixed on a surface of the diaphragm opposite to a surface thereof on which the weight is arranged. Such an acceleration detecting device is constructed so as to detect acceleration in a predetermined direction in such a manner that the acceleration sensor element outputs an acceleration signal depending on deformation of the diaphragm due to application of acceleration to the weight. In particular, an acceleration detecting device disclosed in U.S. Pat. No. 5,571,972 is constructed in the form of a single unit wherein a weight, a diaphragm and a base are formed integrally with each other. The weight, diaphragm and base are mounted directly on a casing of a measuring equipment or an electronic equipment.

Unfortunately, the conventional acceleration detecting device substantially fails to accurately position the weight, diaphragm and base on a casing of a measuring equipment or an electronic equipment.

SUMMARY OF THE INVENTION

The present invention has been made in view of the foregoing disadvantage of the present invention.

Accordingly, it is an object of the present invention to provide an acceleration detecting device which is capable of permitting a weight, a diaphragm and a base to be precisely positioned on a casing of a measuring equipment or an electronic equipment.

It is another object of the present invention to provide an acceleration detecting device which is capable of facilitating mounting of a weight, a diaphragm and a base on a casing of a measuring equipment or an electronic equipment.

It is a further object of the present invention to provide an acceleration detecting device which is capable of preventing occurrence of an error in output thereof due to noise.

In accordance with the present invention, an acceleration detecting device is provided. The acceleration detecting device includes a weight, a diaphragm provided on a central portion thereof with the weight, a base for supporting an outer periphery of the diaphragm, an acceleration sensor element fixed on a surface of the diaphragm opposite to a surface of the diaphragm on which the weight is arranged and constructed so as to output an acceleration signal depending on deformation of the diaphragm due to an action of acceleration on the weight, and an insulating casing made of an insulating resin material and constructed so as to receive the weight, diaphragm, base and acceleration sensor element therein. The acceleration detecting device of the present invention may be any of a one-axis acceleration detecting device for detecting acceleration in a direction of only one axis (X-axis), a two-axis acceleration detecting device for detecting acceleration in each of directions of two axes (X- and Y-axes) and a three-axis acceleration detecting device for detecting acceleration in each of directions of three axes (X-, Y- and Z-directions). In the present invention, the weight, diaphragm and base are integrally formed of a metal material into a single unit. The insulating casing is integrally formed while incorporating the single unit as an insert therein.

The above-described integral formation of the insulating casing while incorporating the single unit as insert therein permits the insulating casing of a desired configuration to be integrally formed together with the weight, diaphragm and base. Thus, mounting of the insulating casing on a casing of a measuring equipment or an electronic equipment permits the single unit to be precisely positioned on the casing of the measuring equipment or the electronic equipment. Also, it facilitates mounting of the weight, diaphragm and base on the casing of the measuring equipment or the electronic equipment.

The acceleration detecting device of the present invention may be so constructed that the insulating casing is provided therein with a recess in which the acceleration sensor element is received and the terminal fitments include ground terminals electrically connected to the base. It is preferable that the recess of the insulating casing is closed with a cover member made of a metal material and the cover member is integrally provided with a contactor, which is elastically pressed against the base when the cover member is kept fixed on the insulating casing so as to close the recess.

Such construction permits the cover member to be grounded through the contactor, base and ground terminal. This permits the metal cover member to act as a shield for shielding noise such as an electromagnetic wave or the like, to thereby prevent intrusion of the noise into the acceleration sensor element. In particular, the contactor is elastically forcibly pressed against the base, so that electrical connection between the cover member and the base may be carried out concurrently with mounting of the cover member and contact between the base and the contactor may be ensured.

Also, in accordance with the present invention, an acceleration detecting device is provided. The acceleration detecting device includes a piezoelectric ceramic substrate, an acceleration sensor element including a detection electrode for detection of acceleration and a plurality of electrodes arranged on one surface of the piezoelectric ceramic substrate and a counter electrode pattern arranged on the other surface of the piezoelectric ceramic substrate in a manner to be opposite to the detection electrode pattern, a diaphragm having the acceleration sensor element connected onto one surface thereof by means of an adhesive layer, a weight fixed on a central portion of the other surface of the diaphragm, a metal base provided with a receiving space in which the weight is received in a manner to be displaceable and arranged so as to support an outer periphery of the diaphragm, an insulating casing constructed so as to receive the diaphragm, base and acceleration sensor element and provided therein with a recess for receiving the acceleration sensor element therein, and a plurality of terminal fitments connected to the electrodes of the acceleration sensor element. The terminal fitments has ground terminals electrically connected to the base, so that the base is electrically connected to the ground terminals of the terminal fitments. The weight, diaphragm and base are integrally formed of a metal material into a single unit. The insulating casing is integrally formed while incorporating the single unit as an insert therein. The insulating casing includes a side wall defining the recess and provided with a window through which the base is partially exposed. The acceleration detecting device also includes a cover member made of a metal material and arranged so as to close the recess of the insulating casing. The cover member is integrally provided with a contactor elastically pressed against the base when the cover member is kept fixed on the insulating casing so as to close the recess.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, an acceleration detecting device according to the present invention will be described hereinafter with reference to the accompanying drawings.

Figure 1:
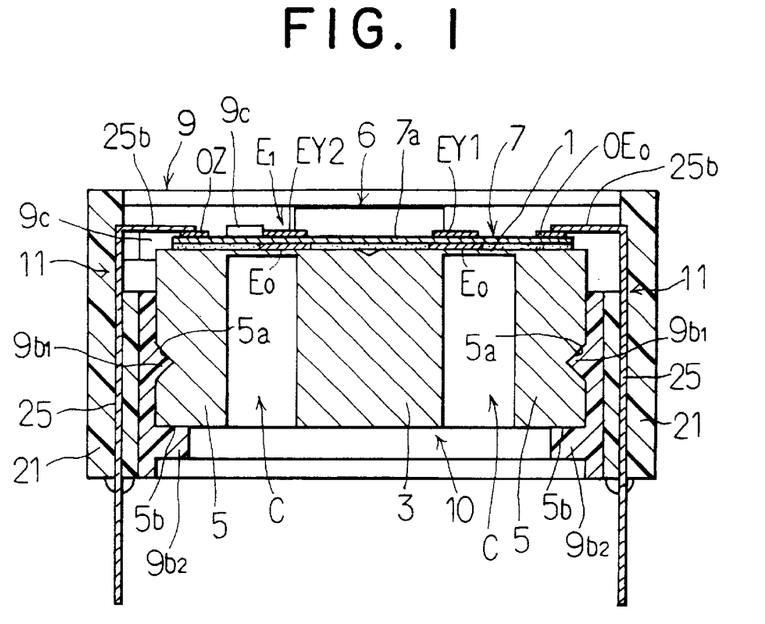
FIG. 1 is a schematic sectional view showing an embodiment of an acceleration detecting device according to the present invention.

Referring first to FIG. 1, an embodiment of an acceleration detecting device according to the present invention is illustrated. An acceleration detecting device of the illustrated embodiment generally includes a diaphragm 1, a weight 3, a base 5 and an acceleration sensor element 7 mounted on a surface of the diaphragm 1 opposite to a surface thereof on which the weight 3 is mounted. In FIG. 1, a thickness of a part of the acceleration sensor element 7 is emphasized for facilitating understanding of the acceleration sensor element 7 and therefore the acceleration detecting device. The members described above are received in a casing 9 made of an insulating resin material. The insulating casing 9 is mounted therein with two terminal units 11 including terminal fitments 25 connected to output electrodes 0Z and OE0 arranged in the acceleration sensor element 7, respectively. Also, the insulating casing 9 is mounted thereon with a cover member 6 made of a metal material.

Figure 2A:
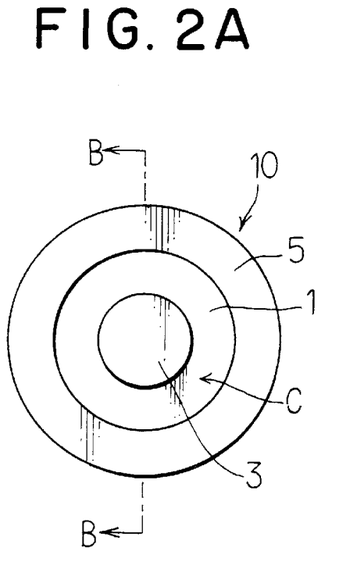
FIG. 2A is a bottom view showing a single unit incorporated in the acceleration detecting device of FIG. 1.
Figure 2B:
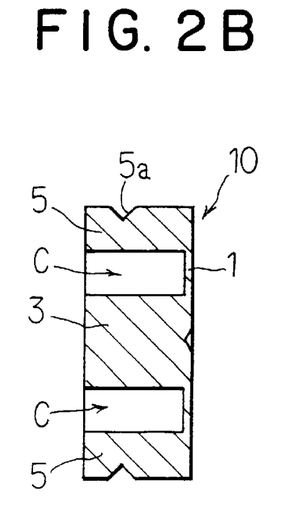
FIG. 2B is a sectional view taken along line B—B of FIG. 2A.

The diaphragm 1, weight 3 and base 5, as shown in FIGS. 1, 2A and 2B, is constructed into a single unit 10 integrally formed of a metal material or brass. The diaphragm 1 is formed into a disc-like configuration and a thickness of about 0.1 mm. The weight 3 is formed into a cylindrical configuration and constructed so as to be integral with the diaphragm while being coaxial with the diaphragm 1. The base 5 is formed into a cylindrical shape and arranged so as to support an outer periphery of the diaphragm 1 thereon. The base 5 is formed on an outer peripheral surface thereof with a V-shaped groove 5a in a manner to continuously extend in a peripheral or circumferential direction thereof. In the illustrated embodiment, a brass material formed into a cylindrical configuration is prepared and then subject to cutting to form an annular cavity C, to thereby provide the weight 3 and base 5. Also, the brass material is subject on a peripheral surface thereof to cutting to form the V-shaped groove 5a, resulting in the single unit 10 being provided.

Figure 3:
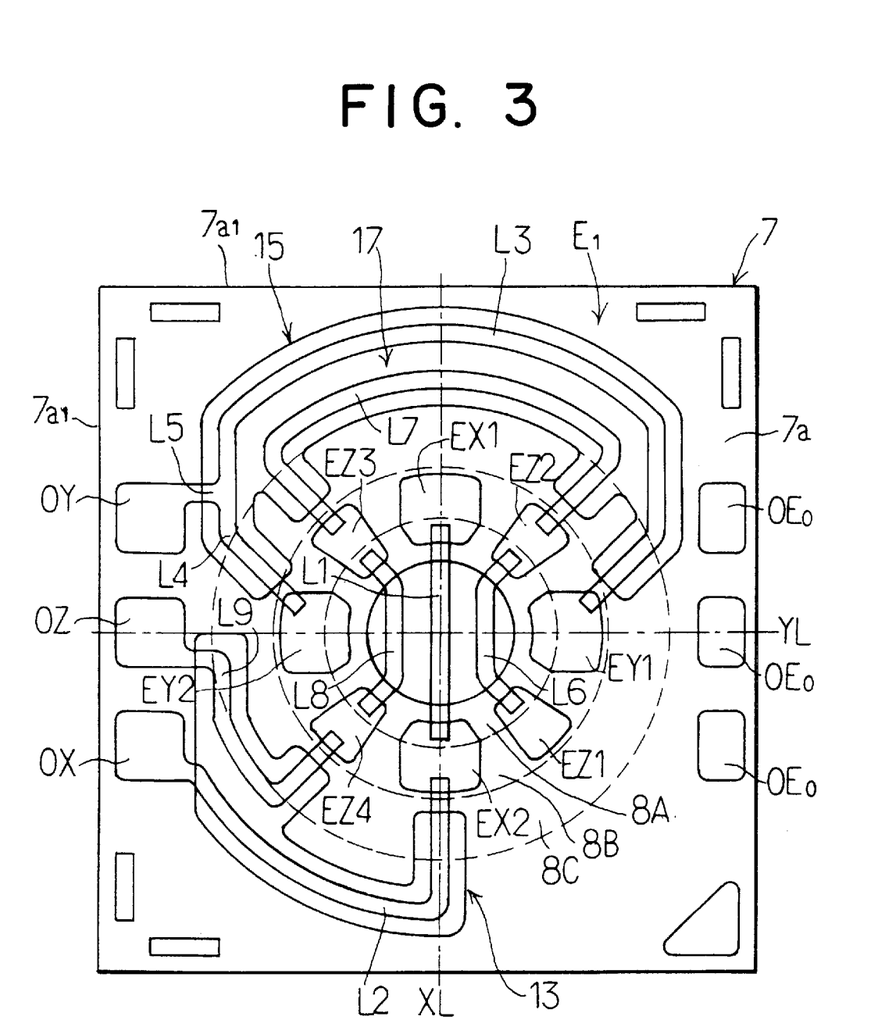
FIG. 3 is a plan view showing an acceleration sensor element incorporated in the acceleration detecting device shown in FIG. 1.

In the illustrated embodiment, the acceleration sensor element 7 is constructed in the form of a piezoelectric-type three-axis acceleration sensor element. More particularly, as shown in FIGS. 1 and 3, a piezoelectric ceramic substrate 7a is formed on a front surface thereof with an electrode pattern E1 for detecting three-axis acceleration and on a rear surface thereof with an annular counter electrode pattern E0 in a manner to be opposite to a main portion of the detecting electrode pattern E1, resulting in the piezoelectric-type three axis acceleration sensor element being provided. The rear surface of the piezoelectric ceramic substrate 7a and the counter electrode pattern E0 are bonded to a front surface of the diaphragm 1 by means of an epoxy adhesive, so that the acceleration sensor element 7 is mounted on the diaphragm 1. The counter electrode pattern E0 is formed on a surface thereof facing the diaphragm 1 with ruggedness. Then, an adhesive is charged between recesses of the ruggedness of the counter electrode pattern E0 and the diaphragm 1, so that the counter electrode pattern E0 is joined to the diaphragm 1 while keeping projections of the ruggedness contacted with the diaphragm 1. This permits the counter electrode pattern E0 to be electrically connected to the base 5 through the diaphragm 1. The piezoelectric ceramic substrate 7a is formed into a contour of a rectangular or square shape. Also, it is subject at a portion thereof corresponding to the electrode to polarization, so that it may generate spontaneous polarization charge when stress is applied thereto. The polarization will be described in detail hereinafter.

The piezoelectric ceramic substrate 7a, as shown in FIG. 3, includes a weight facing region 8A, a first stress generation region 8B and a second stress generation region 8C. The weight facing region 8A is defined at a central portion of the piezoelectric ceramic substrate 1 and formed into a circular shape. The weight 3 is arranged so as to positionally correspond to the weight facing region 8A.

The first stress generation region 8B is formed into an annular shape and arranged so as to surround the weight facing region 8A. The first stress generation region 8B is deformed into two point-symmetrically different states about the center of gravity of the weight 3 when acceleration in a direction parallel to the piezoelectric ceramic substrate 7a is applied to the weight 3. The two different states include a state in which tensile strength is applied thereto and that in which compression stress is applied thereto. Also, when acceleration in a direction perpendicular to the piezoelectric ceramic substrate 7a acts on the weight 3, the first stress generation region 8B is deformed into the same states.

The second stress generation region 8C is formed into an annular shape and arranged so as to surround the first stress generation region 8B. The second stress generation region 8C is deformed into a state different from the first stress generation region 8B, when acceleration in a direction perpendicular to the piezoelectric ceramic substrate 1 is applied to the weight 3. However, the second stress generation region 8C merely generates a slight amount of stress as compared with the first stress generation region 8B.

In the illustrated embodiment, the detection electrode pattern E1 arranged on the front surface of the piezoelectric ceramic substrate 7a and the counter electrode pattern E0 arranged on the rear surface thereof each may be formed by screen printing. Deformation of the diaphragm depending on acceleration applied to the weight 3 causes deflection of the piezoelectric ceramic substrate 7a, leading to a variation in spontaneous polarization which occurs between the detection electrode pattern E1 and the counter electrode pattern E0, resulting in acceleration in three-axis (X-, Y- and Z-axis) directions applied to the weight 3 being measured in the form of a variation in current or voltage. The term "X-axis, Y-axis and Z-axis" used herein indicates axes extending in directions perpendicular to each other. In the illustrated embodiment, the X-axis is defined so as to extend in a direction of a virtual straight line XL, the Y-axis is defined so as to extend in a direction of a virtual straight line YL and the Z-axis is defined so as to extend in a direction perpendicular to a direction of a surface of the piezoelectric ceramic substrate 7a. The detection electrode pattern E1 includes an X-axis direction detection electrode pattern 13, a Y-axis direction detection electrode pattern 15 and a Z-axis direction detection electrode pattern 17.

The X-axis direction detection electrode pattern 13 is constructed in such a manner that two X-axis direction detection electrodes EX1 and EX2 and an X-axis output electrode OX are connected in series to each other by means of connection lines L1 and L2. The X-axis direction detection electrodes EX1 and EX2 are so formed that a large part thereof is positioned on the first stress generation region 8B and an edge thereof along an inner periphery of the first stress generation region 8B is positioned on the weight facing region 8A. The X-axis output electrode OX is formed into a substantially square configuration and arranged on an edge of the piezoelectric ceramic substrate 7a outside the second stress generation region 8C.

The Y-axis direction detection electrode pattern 15 is constructed in such a manner that two Y-axis direction detection electrodes EY1 and EY2 and a Y-axis output electrode OY are connected in series to each other by means of connection lines L3 and L5. The Y-axis direction detection electrodes EY1 and EY2 are formed in a manner similar to the X-axis direction detection electrodes EX1 and EX2. More specifically, they are so formed that a large part thereof is positioned on the first stress generation region 8B and an edge thereof defined along an inner periphery of the first stress generation region 8B is positioned on the weight facing region 8A. The Y-axis direction detection electrodes EY1 and EY2 are arranged symmetrically with each other on a virtual Y-axis straight line YL extending horizontally on the surface of the piezoelectric ceramic substrate 7a while being perpendicular to the virtual X-axis straight line XL on which the electrodes EX1 and EX2 are arranged, with the weight facing region 8A being interposed therebetween. The virtual Y-axis straight line YL and virtual X-axis straight line XL are rendered perpendicular to each other as described above, so that the X-axis direction detection electrode EX1, Y-axis direction detection electrode EY1, X-axis direction detection electrode EX2 and Y-axis direction detection electrode EY2 may be arranged so as to be spaced from each other at angular intervals of 90 degrees. The Y-axis output electrode OY is formed into a substantially square configuration as in the X-axis output electrode OX and arranged side by side with the X-axis output electrode OX while being positioned along an edge of the piezoelectric ceramic substrate 7a outside the second stress generation region 8C.

The Z-axis direction detection electrode pattern 17 is constructed in such a manner that Z-axis direction detection electrodes EZ1, EZ2, EZ3 and EZ4 and a Z-axis output electrode OZ are connected in series to each other in order by means of connection lines L6 to L9. Four such Z-axis direction detection electrodes EZ1 to EZ4 each are formed into a configuration like a square. The Z-axis direction detection electrodes EZ1 to EZ4 each are so arranged that a main part thereof is positioned on the first stress generation region 8B and an edge defined along an inner periphery of the first stress generation region 8B is positioned on the weight facing region 8A, as in the X-axis direction detection electrodes EX1 and EX2. Also, the Z-axis direction detection electrodes EZ1 to EZ4 are arranged at a central portion between the X-axis direction detection electrode EX2 and the Y-axis direction detection electrode EY1, that between the Y-axis direction detection electrode EY1 and the X-axis direction detection electrode EX1, that between the X-axis direction detection electrode EX1 and the Y-axis direction detection electrode EY2, and that between the Y-axis direction detection electrode EY2 and the X-axis direction detection electrode EX2, respectively. Thus, the Z-axis direction detection electrodes EZ1 to EZ4 are arranged in a manner to be spaced from each other at angular intervals of 90 degrees. Such arrangement permits the X-axis direction detection electrodes EX1 and EX2, Y-axis direction detection electrodes EY1 and EY2, and Z-axis direction detection electrodes EZ1 to EZ4 to be arranged in an annular array on the first stress generation region 8B of the piezoelectric ceramic substrate 7a while surrounding the weight facing region 8A. The Z-axis output electrode OZ is formed into a substantially square shape as in the X-axis output electrode OX. Also, the Z-axis output electrode OZ is arranged alongside of the X-axis output electrode OX and Y-axis output electrode OY while being positioned at an edge of the piezoelectric ceramic substrate 7a outside the second stress generation region 8C.

The piezoelectric ceramic substrate 7a is formed on an edge thereof positioned symmetrically with the edge thereof on which the output electrodes OX, OY and OZ are arranged in parallel to each other with three ground electrodes OE0 in a manner to be parallel to the output electrodes OX, OY and OZ. The ground electrodes OE0 are connected to the counter electrode pattern E0 via a through-hole conductive section formed via the piezoelectric ceramic substrate 7a and a connection wire (now shown). Alternatively, a conductive adhesive may be used for accomplishing positive connection between the ground electrodes OE0 and the base 5. The output electrodes thus incorporated in the acceleration sensor element 7 are arranged while being divided into a group including the electrodes OX, OY and OZ and a group including the ground electrodes OE0 . . . . In the illustrated embodiment, three such electrodes positioned on the outer periphery of the piezoelectric ceramic substrate 7a each are constituted by the ground electrode OE0. Alternatively, the three electrodes may be so constructed that at least one thereof is constituted of the ground electrode OE0 and the remaining two each are a dummy electrode merely for terminal connection.

The piezoelectric ceramic substrate 7a is subject at portions thereof corresponding to the X-axis direction detection electrodes EX1 and EX2 to polarization so that spontaneous polarization charges having polarities opposite to each other respectively appear on the X-axis direction detection electrode EX1 positioned on one side of the weight facing region 8A and the X-axis direction detection electrode EX2 positioned on the other side thereof, when stress of the same type occurs on each of the above-described portions of the piezoelectric ceramic substrate 7a.

Also, portions of the piezoelectric ceramic substrate 7a corresponding to the Y-axis direction detection electrodes EY1 and EY2 are subject to polarization so that spontaneous polarization charges having polarities opposite to each other respectively appear on the Y-axis direction detection electrode EY1 positioned on one side of the weight facing region 8A and the Y-axis direction detection electrode EY2 positioned on the other side thereof, when stress of the same type occurs on each of the above-described portions of the piezoelectric ceramic substrate 7a, as in the portions of the piezoelectric ceramic substrate 7a corresponding to the X-axis direction detection electrodes EX1 and EX2.

In addition, the piezoelectric ceramic substrate 7a is subject at portions thereof corresponding to the Z-axis direction detection electrodes EZ1 to EZ4 to polarization so that spontaneous polarization charges having polarities identical with each other appear on the Z-axis direction detection electrodes EZ1 to EZ4 when stress of the same type occurs on each of the above-described portions of the piezoelectric ceramic substrate 7a.

In the illustrated embodiment, polarization of the piezoelectric ceramic substrate 7a is carried out by screen-printing the acceleration detection electrodes EX1 to EZ4 and counter electrode pattern E0 using a silver paste and then calcining them, followed by application of a DC voltage between the electrodes opposite to each other. Then, the connection lines L1 to L9 are screen-printed using a solver paste, resulting in the acceleration detection electrode pattern E1 being provided.

Figure 4A:
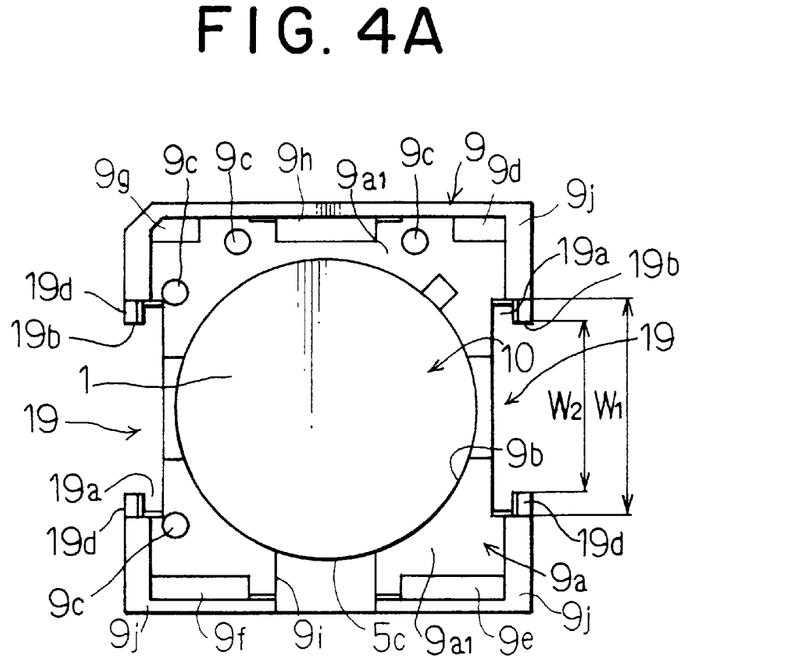
FIG. 4A is a plan view showing a casing formed of an insulating resin material by injection molding while incorporating a single unit as an insert therein.

Now, the insulating casing 9 formed by subjecting an insulating resin material to injection molding while using the single unit 10 as an insert will be described with reference to FIGS. 4A to 4C. In FIG. 4A, the cover member 6 is removed from the insulating casing 9 for the sake of brevity. The insulating casing 9, as shown in FIG. 4A, has a contour of a rectangular shape and is formed on a side thereof on which the diaphragm is positioned with a recess 9a. Thus, the insulating casing 9 has a side wall 9j arranged so as to surround or define the recess 9a. The side wall 9j is formed with cutouts including grooves 19a and 19b and a part of a window 9i, resulting in being constituted by three wall sections segmented by the cutouts. The diaphragm 1 is exposed on a bottom surface 9a1 of the recess 9a. The recess 9a is formed on a bottom side thereof with a single unit receiving section 9b, which is formed therein with a projection 9b1, which is fitted in the V-shaped groove 5a formed on the outer periphery of the base 5 of the single unit 10. Also, the single unit receiving section 9b is formed with a projection 9b2, which is contacted with an end surface 5b of the base 5 opposite to the diaphragm 1. In the illustrated embodiment, the single unit 10 is formed as an insert integrally with the insulating casing 9 by injection molding, so that the projections 9b1 and 9b2 may function as a stopper. The recess 9a is integrally formed on the bottom surface 9a1 thereof with four positioning projections 9c constituting a positioning section for the piezoelectric ceramic substrate 7a and five ribs 9d to 9h for carrying the cover member 6 thereon. The positioning projections 9c function to contact with adjacent two sides of the piezoelectric ceramic substrate 7a to align a center of the diaphragm 1 or that of the weight with a center of the piezoelectric ceramic substrate 7a when the piezoelectric ceramic substrate 7a is positioned in the recess 9a of the insulating casing 9. In the illustrated embodiment, the positioning projections 9c are arranged so that each two thereof are abutted against two sides 7a1 of the piezoelectric ceramic substrate 7a perpendicular to each other. The cover carrying ribs 9d to 9h each are so formed that a height thereof upwardly extending from the bottom surface 9a1 is larger than that of the positioning projections 9c upwardly extending form the bottom surface 9a1. The cover carrying ribs 9d to 9h act to carry or support the cover member 6 thereon. Of the cover carrying ribs 9d to 9h, four cover carrying ribs 9d to 9g are formed in a manner to be associated with or connected to the side wall 9j and bottom surface 9a1 at four corners of the bottom surface 9a1. The other cover carrying rib 9h is formed so as to be connected to the side wall 9j and bottom surface 9a1 between the cover carrying ribs 9g and 9d.

Also, the window 9i briefly described above is formed at a part of the bottom surface 9a1 of the insulating casing 9 and a portion of the side wall 9j contiguous to the part of the bottom surface, resulting in a part of the outer periphery of the base 5 being exposed as indicated at reference character 5c.

Figure 4B:
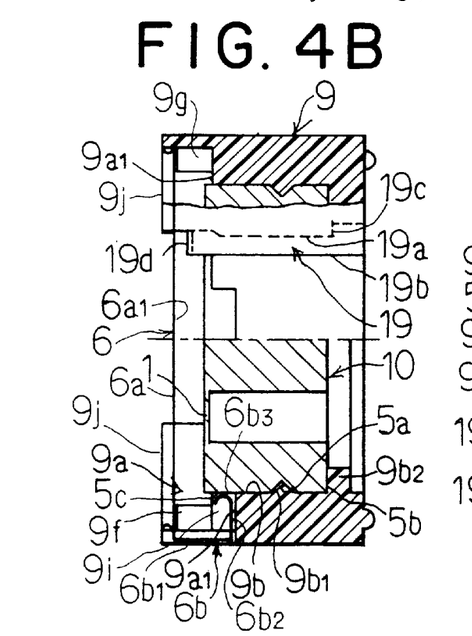
FIG. 4B is a partially cut-away sectional side elevation view of the casing shown in FIG. 4A.
Figure 4C:
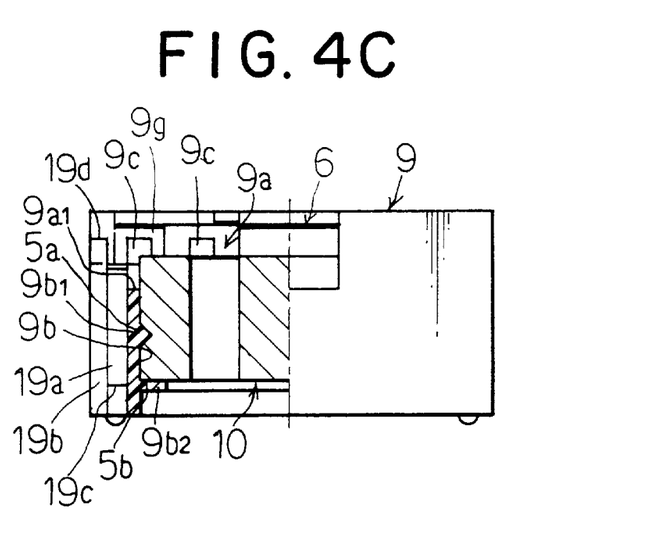
FIG. 4C is a partially cut-away front elevation view of the casing shown in FIG. 4A.
Figure 5A:
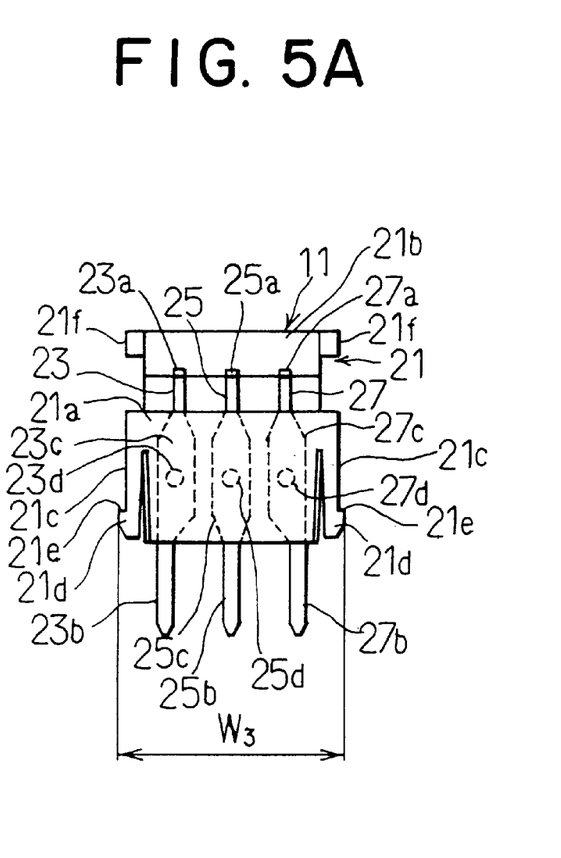
FIG. 5A is a plan view showing a terminal unit incorporated in the acceleration detecting device shown in FIG. 1.
Figure 5B:
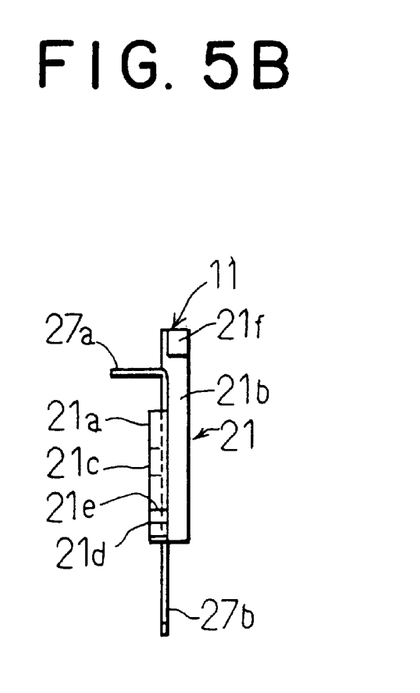
FIG. 5B is a side elevation view of the terminal unit shown in FIG. 5A.

Two such side wall sections of the insulating casing 9 opposite to each other with the single unit being interposed therebetween, as shown in FIGS. 4A to 4C, each are formed with a support fit groove 19, in which a terminal support 21 of each of the terminal units 11 shown in FIGS. 5A and 5B is fixedly fitted. First, the terminal unit 11 will be described for facilitating understanding of the support fit groove 19. The terminal unit 11 includes the terminal support 21 formed by insert molding while incorporating three terminal fitments 23, 25 and 27 as an insert therein. The terminal fitments 23 to 27 each are formed into an inverted L-shape and include one end 23a (25a, 27a) horizontally extending in FIGS. 5A and 5B and the other end 23b (25b, 27b) downwardly extending from the one end. Also, the terminal fitments 23 to 27 each include a central portion 23c (25c, 27c) which is formed into a width larger than that of both ends thereof. The central portion of each of the terminal fitments 23 to 27 is formed with a through-hole 23d (25d, 27d) in which molding resin is filled. The terminal support 21 includes a first section 21a defined in a direction of extension of the ends 23a to 27a about the terminal fitments 23 to 27 and a second section 21b extending in a direction opposite to that of the ends 23a to 27a. The first section 21a is integrally formed on both sides thereof defined in a width direction thereof with a pair of arms 21c downwardly extending toward the other ends 23b to 27b of the terminal fitments 23 to 27. Between each of the arms 21c and the first section 21a is formed a gap which permits the arms 21c to be deformed toward a side surface of the first section 21a. The arms 21c each are formed at a distal end thereof with a hook-like engagement 21d. The engagements 21d each have an engagement surface 21e formed so as to extend outwardly or in a direction away from the first section 21a. Also, the second section 21b of the terminal support 21 is arranged so as to upwardly extend above the one end 23a to 27a of the terminal fitments 23 to 27 or in a direction opposite to the direction in which the other ends 23b to 27b of the terminal fitments 23 to 27 extend. The second section 21b is provided at an upper end thereof with a pair of projections 21f in a manner to extend from both sides of the upper end thereof in a direction of a width thereof or in a direction in which three such terminal fitments 23 to 27 are arranged.

The support fit grooves 19 of the insulating casing 9 each are constructed so as to permit the terminal support 21 of each of the terminal units 11 to be fitted therein and prevent dislocation of the terminal support 21 therefrom due to application of external force thereto. More particularly, the support fit groove 19 is formed so as to be open in an axial direction of the weight 3 or a direction of thickness of the insulating casing 9 and a direction perpendicular to an outer peripheral surface of the weight 3 or a side wall of the insulating casing 9. The support fit groove 19 includes a first groove section 19a in which the first section 21a of the terminal support 21 is fitted and a second section 19b in which the second section 21b of the terminal support 21 is fitted. The first groove section 19a has a main portion of W1 in width, which is defined to be larger than a width W3 (FIG. 5A) of the first section 21a including a pair of the arms 21c, which width W3 is obtained when any force is kept from being applied to the arms 21c of the first section 21a, so that approach of the arms 21c to each other may permits the first section 21a including the arms 21c to be fitted in the first groove section 19a. The second groove section 19b includes a main portion having a width W2, which permits the second section 21b of the terminal support 21 of the terminal unit 11 to be fitted in the second groove section 19b. Also, the first groove section 19a, as shown in FIG. 4B, is so constructed that an end thereof opposite to the recess 9a is increased in width. Such construction permits the first groove section 19a to be provided with a pair of steps each constituting an engagement surface 19c engaged with the engagement surface 21e of the engagement 21d of each of the arms 21c integrally formed on the first section 21a of the terminal support 21. Likewise, the second groove section 19b is constructed so as to be increased in width on a side thereof facing the recess 9a, resulting in being formed on the side thereof facing the recess 9a with a pair of steps each constituting an engagement surface 19d engaged with each of the projections 21f of the second section 21b of the terminal support 21. Engagement between the projections 21f and the engagement surfaces 19d prevents the terminal unit 11 from being excessively forced into the support fir groove 19.

In the illustrated embodiment, the engagements 21d of the arms 21c integrally provided on the first section 21a of the terminal support 21 and the steps (engaged portions) provided in the first groove section 19a so as to constitute the engagement surfaces 19c cooperate with each other to provide a first engagement structure. Likewise, the projections 21f integrally provided on the second section 21b (engagements) of the terminal fitment and the steps (engaged portions) provided in the second groove section 19b so as to provide the engagement surfaces 19d cooperate with each other to provide a second engagement structure. The first and second engagement structures thus provided function to prevent dislocation of the terminal support 21 fitted in the support fit groove 19 therefrom.

The ends 23a to 27a of the terminal fitments 23 to 27 of one of the terminal units 11 in which the terminal supports 21 are fixedly fitted in the support fit grooves 19 are respectively connected to the output electrodes OX, OY and OZ of one group by soldering or by means of a conductive adhesive and the ends 23a to 27a of the terminal fitments 23 to 27 of the other terminal unit are respectively connected to the ground electrodes OE0 of the other group by soldering or by means of a conductive adhesive. In the illustrated embodiment, the terminal fitments 23 to 27 of the other terminal unit connected to the ground electrodes OE0 each constitute a ground terminal. As described above, the counter electrode pattern E0 is electrically connected to the base 5 and ground electrodes OE0. This permits the ground terminal 23 to 27 of the other terminal unit and the base 5 to be electrically connected to each other.

The illustrated embodiment, as described above, is so constructed that the terminal unit 11 is fixed in the insulating casing 9 by fitting. Such construction not only permits a mold for the insulating casing to be simplified in structure as compared with insert molding of the insulating casing while incorporating the single unit 10 and terminal fitments 23 to 27 as an insert therein, but reduces a manufacturing cost of the insulating casing, leading to a reduction in cost of the acceleration detecting device, although it causes the number of parts to be increased. Also, the terminal units 11 are constructed into the same structure, to thereby reduce kinds of the parts, resulting in the acceleration detecting device being further decreased in manufacturing cost.

In addition, fitting of the two terminal units 11 in the two support fit grooves 19 in the illustrated embodiment facilitates mounting of the terminal units 11 on the outer surface of the insulating casing 9. Also, the two terminal units 11 permit the acceleration detecting device of the illustrated embodiment to be stably supported on a circuit board or the like.

Figure 6A:
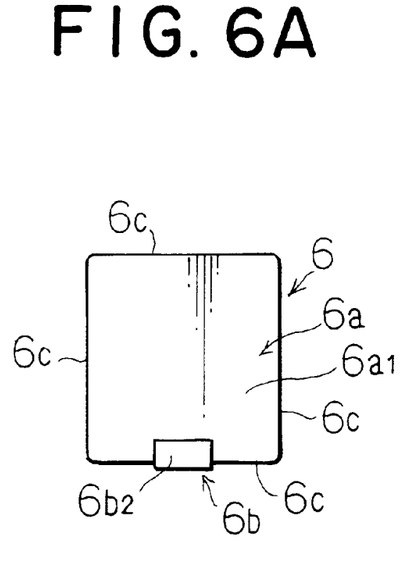
FIG. 6A is a bottom view showing a cover member mounted on a casing made of an insulating resin material, which is viewed from a side of diaphragm.
Figure 6B:
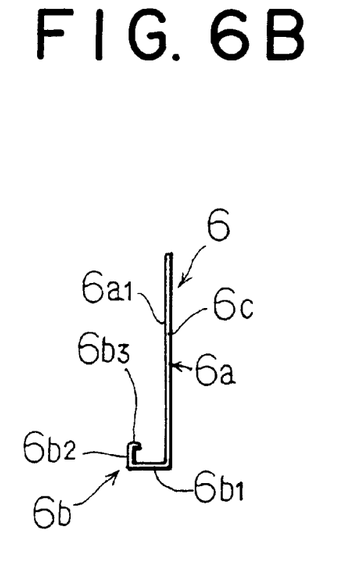
FIG. 6B is a side elevation view of the cover member shown in FIG. 6A.

Now, the cover member 6 which is mounted on the insulating casing 9 will be described with reference to FIGS. 6A and 6B. The cover member 6 is made of a metal material such as stainless steel which functions to shield noise such as an electromagnetic wave or the like and includes a cover body 6a and a contactor 6b integrally provided on the cover body 6a. The cover body 6a is formed into a substantially rectangular or square shape so as to close the recess 9a of the insulating casing 9, to thereby cover the whole acceleration sensor element 7. The cover body 6a is supported at an edge of a rear surface 6a1 thereof on the cover carrying ribs 9d to 9h while keeping a side surface 6c thereof abutted against an inner surface of the side wall 9j of the insulating casing 9, as shown in FIGS. 4A and 4B. The contactor 6b includes a first linear portion 6b1 arranged so as to extend in a direction perpendicular to a surface of the cover body 6a from a central portion of one side of the cover body 6a, a second linear portion 6b2 arranged so as to extend from the first linear portion 6b1 toward a central portion of the cover body 6a while being parallel to the surface of the cover body 6a, and an abutment 6b3 of a semi-arcuate shape arranged so as to extend from the second linear portion 6b2 toward the cover body 6a. The contactor 6b is arranged in the window 9i so as to contact the abutment 6b3 with a contact section 5c of the base 5 while keeping the cover member 6 fixed on the insulating casing 9 so as to close the recess 9a. The second linear portion 6b2 is formed into a dimension which permits an angle between the cover member 6a and the first linear portion 6b1 to be slightly larger than 90 degrees, resulting in the first linear portion 6b1 slightly bending. This causes the contactor 6b to be elastically pressed against the base 5 through the window 9i, so that the cover member 6 may be electrically connected to the ground terminals 23 to 27 through the base 5. Also, the cover body 6a of the cover member 6 prevents noise such as an electromagnetic wave or the like from intruding into the acceleration sensor element 7. Further, in the illustrated embodiment, the cover body 6a is so formed that the side surface 6c thereof is tightly fitted in the side wall 9j of the insulating casing 9, so that mounting of the cover member 6 in the insulating casing 9 may be facilitated by merely pressedly forcing the cover body 6a of the cover member 6 into the recess 9a of the insulating casing 9. The cover carrying ribs 9d to 9h and an outer periphery of the cover body 6a are joined together by means of an adhesive, to thereby enhance bonding therebetween.

In the illustrated embodiment, the acceleration sensor element is constituted by a piezoelectric-type acceleration sensor element. However, the present invention may be effectively applied to an acceleration sensor element of a different type such as a semiconductor-type acceleration sensor element, a capacitance-type one or the like.

While a preferred embodiment of the invention has been described with a certain degree of particularity with reference to the drawings, obvious modifications and variations are possible in light of, the above teachings. It is therefore to be understood that within the scope of the appended claims, the invention may be practiced otherwise than as specifically described.

What is claimed is:

1. An acceleration detecting device comprising:
   a weight;
   a diaphragm provided on a central portion thereof with said weight;
   a base for supporting an outer periphery of said diaphragm;
   an acceleration sensor element fixed on a surface of said diaphragm opposite to a surface of said diaphragm on which said weight is arranged and constructed so as to output an acceleration signal depending on deformation of said diaphragm due to an action of acceleration on said weight; and
   an insulating casing made of an insulating resin material and constructed so as to receive said weight, diaphragm, base and acceleration sensor element therein;
   said weight, diaphragm and base being integrally formed of a metal material into a single unit;
   said insulating casing being integrally formed while incorporating said single unit as an insert therein;
   wherein said acceleration sensor element includes a plurality of electrodes including ground electrodes;
   further comprising a plurality of terminal fitments connected to said electrodes of said acceleration sensor element;
   wherein said terminal fitments are divided into two groups;
   said terminal fitments which constitute said two groups each being fixed on each of terminal supports made of an insulating resin material, to thereby constitute each of two terminal units;
   said insulating casing being formed on an outer surface thereof with two support fit grooves in which said terminal supports of said terminal units are fixedly fitted;
   said terminal units each being fitted in each of said support fit grooves.

2. An acceleration detecting device as defined in claim 1, wherein said terminal units are formed into the same configuration and dimensions; and
   said electrodes of said acceleration sensor element are arranged at a position which permits said electrodes to be connected to said terminal fitments supported in said terminal units fitted in said support fit grooves while being divided into two groups.

3. An acceleration detecting device as defined in claim 2, wherein each of said terminal supports is fixed in said insulating casing through an engagement structure;
   said engagement structure including at least one engagement provided at each of said terminal supports and at least one engaged section provided at said insulating casing and engaged with said engagement so as to permit insertion of each of said terminal supports into said support fit grooves and prevent each of said terminal supports fitted in said support fit grooves from being dislocated therefrom.

4. An acceleration detecting device as defined in claim 3, wherein each of said terminal supports is provided with a pair of hook-like engagements; and
   said engaged section of said insulating casing is constituted of steps each having a surface with which an engagement surface of each of said hook-like engagements is contacted.

5. An acceleration detecting device comprising:
   a weight;
   a diaphragm provided on a central portion thereof with said weight;
   a base for supporting an outer periphery of said diaphragm;
   an acceleration sensor element fixed on a surface of said diaphragm opposite to a surface of said diaphragm on which said weight is arranged and constructed so as to output an acceleration signal depending on deformation of said diaphragm due to an action of acceleration on said weight, said acceleration sensor element comprising a plurality of electrodes including ground electrodes and a plurality of terminal fitments connected to said electrodes of said acceleration sensor element;
   an insulating casing made of an insulating resin material and constructed so as to receive said weight, diaphragm, base and acceleration sensor element therein;
   said weight, diaphragm and base being integrally formed of a metal material into a single unit;
   said insulating casing being integrally formed while incorporating said single unit as an insert therein;
   wherein said metal material is in the form of a cylindrical shape;
   said single unit is formed by subjecting said metal material to cutting; and
   wherein said insulating casing is provided therein with a recess in which said acceleration sensor element is received; and
   said terminal fitments include ground terminals electrically connected to said base;
   said recess of said insulating casing being closed with a cover member made of a metal material; and
   said cover member being integrally provided with a contactor elastically pressed against said base when said cover member is kept fixed on said insulating casing so as to close said recess.

6. An acceleration detecting device comprising:
   a piezoelectric ceramic substrate;
   an acceleration sensor element comprising a detecting electrode pattern for detection of acceleration, said detecting electrode pattern comprising a plurality of electrodes arranged on one surface of said piezoelectric ceramic substrate, and a counter electrode pattern arranged on the other surface of said piezoelectric ceramic substrate in a manner to be opposite to said detecting electrode pattern;
   a diaphragm having said acceleration sensor element connected onto one surface thereof by means of an adhesive layer;

a weight fixed on a central portion of the other surface of said diaphragm;

a metal base provided with a receiving space in which said weight is received in a manner to be displaceable and arranged so as to support an outer periphery of said diaphragm;

an insulating casing constructed so as to receive said diaphragm, base and acceleration sensor element and provided therein with a recess for receiving said acceleration sensor element therein;

a plurality of terminal fitments connected to said electrodes of said acceleration sensor element;

said terminal fitments having ground terminals electrically connected to said base;

said base being electrically connected to said ground terminals of said terminal fitments;

said weight, diaphragm and base being integrally formed of a metal material into a single unit;

said insulating casing being integrally formed while incorporating said single unit as an insert therein;

said insulating casing including a side wall which defines said recess and is provided with a window through which said base is partially exposed; and a cover member made of a metal material and arranged as to close said recess of said insulating casing;

said cover member being integrally provided with a contactor elastically pressed against said base when said cover member is kept fixed on said insulating casing so as to close said recess.

* * * * *